Reissued Sept. 9, 1952

Re. 23,548

UNITED STATES PATENT OFFICE 23,548

METHOD OF PRESERVING SPRAY DRIED FOOD PRODUCTS

Paul F. Sharp, Oakland, Calif., and Arell J. Wasson, Omaha, Nebr., assignors to Golden State Company, Ltd., San Francisco, Calif., a corporation of Delaware No Drawing. Original No. 2,541,441, dated February 13, 1951, Serial No. 2,955, January 17, 1948. Application for reissue January 26, 1952, Serial No. 268,454

10 Claims. (Cl. 99—151)

Matter enclosed in heavy brackets [ ] appears in the original patent but forms no part of this reissue specification; matter printed in italics indicates the additions made by reissue.

*This is an application for reissue of Patent No. 2,541,441, issued February 13, 1951, on application Serial No. 2,955, filed January 17, 1948.*

[This] *That* application [is] *was* a continuation in part of our application Serial No. 551,748, filed August 29, 1944, and entitled "Process for the Treatment of Powdered Food Materials," now abandoned.

This invention relates generally to processes for the removal of free or uncombined oxygen from various food products, particularly desiccated products such as powdered whole milk, powdered ice cream, desiccated eggs, and the like.

It is recognized by the food industry that oxidation of certain constituents of powdered food products, particularly the fat content is a serious problem in connection with preservation and marketing. Oxidation materially affects the taste and quality of the product and may proceed to the point of spoilage.

In the past, various methods have been proposed for treating food products in order to have the material satisfactorily packaged in an inert atmosphere. All of these processes involve either a short term vacuum treatment or a short term flushing treatment and introduction of powder into a container where an atmosphere of inert gas is introduced and the container sealed. For example, in one such method a small pellet of solid carbon dioxide is introduced into a final container and the powdered product filled in on top. The pellet is of such size as to be completely sublimed in the few minutes required for the free space in the container to be swept free of air. When sublimation is approximately complete the package is closed.

Another method is to package powder in a final container having a vent for removal and introduction of gas. The containers are subjected to a vacuum for a period of 1 to 5 minutes in equipment elaborately constructed for airtightness.

Neither of these systems is satisfactory in dealing with spray dried products such as powdered milk. Such products require that the oxygen content of the gases in the final container be less than 2% and preferably 1.5% for safe storage over extended periods, say 6 months at temperature conditions found in storage plants. The above described systems fail permanently to reduce the oxygen content to the safe range.

In order to reduce the oxygen content to the required level for storage, spray dried powders treated as described above are subjected after storage for several days or more to a second evacuation and gassing. Such procedure is expensive because of the large amount of vacuum chamber space required for a given plant capacity and because of the storage space required. Additional expenses are incurred for multiple handling of packaged material in and out of the treatment chamber and through loss of all the inert gas used in the first gassing treatment.

It is an object of the present invention to provide a method which meets and overcomes the disadvantages of the above described systems of powder treatment.

It is an object of the present invention to provide a simple and highly effective method for the removal of free oxygen which does not require the use of long term vacuumizing treatment.

It is another object of the present invention to provide an effective method for the elimination of objectionable quantities of free oxygen which is entrapped within particles of spray dried powders.

It is still another object of the present invention to provide a method of treating powders with inert gas whereby the powder may be handled in air over an extended period during packaging without materially raising the oxygen content to be found in the final sealed container.

Additional objects of the invention will appear from the following description in which the preferred embodiment is set forth in detail.

The present invention is characterized by the use of inert or oxygen free gases for the purpose of removing oxygen from the powder as a pretreatment to condition the powder so that it may be handled in air while being packaged and packaging the powder under conditions whereby the oxygen content of the gases in the sealed container will not be sufficient to effect oxidation of the powder during storage. This free oxygen may consist of oxygen entrapped between the particles, adsorbed by the particles and that held within the particle cores as part of a gaseous mixture. The entrapped and adsorbed oxygen is readily dealt with by any of the above mentioned systems but applicants' new combination of treatment steps in addition efficiently removes the core oxygen, replaces it with an inert atmosphere and so conditions the powder that the recapture of oxygen is rendered inconsequential over reasonable periods of time even though the powder is handled in air during the transfer to sales containers.

In the new process, the first step is characterized by a procedure for application of an inert gas to the powder, whereby a combination of diffusion and gas ratio control effects efficient removal of free oxygen of whichever type without the use of special apparatus other than bulk containers. Thus a mass of powdered material to be treated is placed in a bulk container whether it be a barrel holding 200 pounds of powder or a closed hopper of steel capable of holding ten or twelve thousand pounds of powder, and inert gas introduced into the container over a substantial period of time in a manner which prevents the oxygen content of the gas passing through the container from approaching equilibrium with the gasses within the powder particles. It has been found that this treatment, when extended over a practical period of time, is highly effective to remove the free oxygen.

The method of introduction of inert gas depends upon the type of bulk handling equipment and the specific gravity of the inert gas relative to oxygen. Thus in one embodiment of the invention, gasses lighter than oxygen are caused to flow downward through the bulk of powder displacing oxygen in the direction which its heavier character naturally tends to carry it. When using gasses heavier than oxygen, the flow for most efficient operation, is caused to be upward. The method of introduction of the gas may vary in practice for convenience under circumstances such as for example where the gas is solidified carbon dioxide or Dry Ice, a desired quantity of which is introduced into the bottom of a barrel and covered with powdered food material whereby carbon dioxide gas is produced by continuous sublimation thus causing a continuous displacement of gasses upwardly with fresh pure carbon dioxide.

Reference is made to carbon dioxide gas but other inert or oxygen free gasses may be used. Thus, in addition to carbon dioxide the gasses, nitrogen, argon, helium, ethane, ethylene, carbon monoxide, nitrous oxide, sulfur dioxide, hydrogen, and the like may be used as well as synthetic and natural mixtures of inert gasses such as for example, nitrogen and ethylene, carbon dioxide and nitrous oxide, or natural gas which consists primarily of methane and carbon dioxide and combustion gasses which consist primarily of carbon dioxide, carbon monoxide and nitrogen.

Various inert gasses have been cited and are useful both in the pretreatment and for the final atmosphere in storage containers. While all these gasses are effective when relatively pure, some gasses such as sulfur dioxide and others have the additional advantage of exerting a preserving effect.

[In carrying out the first step of the present process a large steel tank with tapered bottom may be used as the bulk container for powder. In this type of tank, it is preferable but not necessary to flow light gas downward since the leakage will tend to be about the powder outlet valve. This tank is closed at the top by a cover adapted to make the top airtight. A gas inlet is provided in the lower part of the tank in the cover and a gas outlet is provided near the powder outlet valve. The powder outlet valve is located at the bottom of the tank in conjunction with suitable agitating means to insure an even flow.]

[Such a tank is filled with powder and a gas such as relatively pure nitrogen continuously introduced through the gas inlet. The gas, after an initial charge of gas has been introduced, is fed into the tank generally at a rate of between about 1 and 15 cubic feet per hour and preferably at about 3 to 6 cubic feet per hour for tanks holding 10,000 pounds of powder. This is at the rate of approximately 0.01 to 0.15 cubic feet of gas per hour per 100 pounds of food products for the broader range and approximately 0.003 to 0.006 cubic feet of gas per 100 pounds of food products for the preferred range. A mixture of gasses consisting primarily of nitrogen and oxygen is vented through the gas outlet. The external oxygen about the particles is quickly displaced at a rate dependent upon the rate of gas introduction after which the atmosphere within the particles gives up oxygen to the low oxygen content external gas atmosphere. The build up of oxygen in the gas outside the powder particles, after the initial flushing is completed, is controllable by the gas displacement rate. At the rates mentioned above, the oxygen content of the gasses vented from the chamber after about 24 hours of treatment seldom exceeds 1%.]

[An alternative] *A* procedure for carrying out the present method[, when the above large scale equipment is not available,] is that embodiment of the invention, in which a conventional wood barrel may be employed. The interior of this barrel is provided with a suitable liner such as one made from moisture-proof cellophane or laminated paper having coatings of asphalt or like material between the laminae. Immediately prior to introducing the powdered material, a slab of Dry Ice is placed on the bottom of the barrel. At that time the lid is removed and the upper end of the liner is open. Powdered material is introduced directly upon the Dry Ice and thereafter the upper end of the liner is gathered together and tied. This serves to generally close the top of the liner so that it in effect forms a vent. It is also desirable to apply the lid in order to avoid free communication with the atmosphere.

The barrel is now permitted to stand for a substantial period of time, preferably without substantial agitation while the solid carbon dioxide sublimes. Carbon dioxide gas produced by sublimation slowly permeates and flushes upwardly throughout the mass of material, with the displaced air being discharged from the top of the liner and about the cover. The carbon dioxide atmosphere within the liner is of low oxygen content. In time the oxygen of the gas within the powder particles is given up to the external carbon dioxide atmosphere and the oxygen diffused outward is swept upward with the carbon dioxide displaced by pure carbon dioxide freshly formed by sublimation. Thus in time substantially all of the internal oxygen of the particles is diffused outward and removed from contact with the powder by being swept out of the container.

As previously indicated it is feasible to use various types of containers for carrying out the method. Another type of container which can be used for carrying out the method consists of a metal drum provided with a lid which can be made gas-tight. The lid is provided with a vent pipe equipped with a check valve to permit the escape of gas from the interior of the drum but preventing the entrance of exterior air. Such a drum can be used in the same manner as the barrel described above.

With respect to the retention period required for treatment with inert gas, it has been found that this should be extended for a period of the order of 15 hours or more to secure the best results. In commercial operations the retention period can be selected to suit the convenience of other plant operations and may for example be a period between the range of 18 to 24 hours or even longer.

The amount of solid carbon dioxide or Dry Ice employed, in the second embodiment of this invention, is dependent upon certain factors, including particularly the length of the retention period, because at the end of the period it is desirable to have some residual solid carbon dioxide. If one should use an insufficient amount of Dry Ice so that it is consumed before the end of the retention period, there is an opportunity for atmosphere to permeate back into the mass of material, thus materially increasing the free oxygen content. The period of time over which the mass of Dry Ice will sublime is dependent not only upon the quantity of the Dry Ice, but also somewhat upon its physical dimensions. For example, a slab of Dry Ice measuring 1 inch thick and 10 inches square will sublime more rapidly than a slab measuring 4 inches thick, and 5 inches square. In commercial operations it is therefore desirable that the dimensions of the mass of carbon dioxide be maintained fairly constant for successive batches of material.

The amount of solid carbon dioxide and the length of the retention period may also vary somewhat depending upon the extent to which it is desired to remove free oxygen and upon the particular kind of powdered material being treated. By way of example good results have been obtained in the treatment of spray dried whole milk powder with a retention period varying from 18 to 24 hours, using a barrel containing 200 pounds of the powder, and with about five pounds of solid carbon dioxide. Such treatment serves to reduce the free oxygen of the atmosphere between the powdered particles to a value below 3%, as for example, from 2.5 to 1.5%. In referring to the oxygen content of the atmosphere between the particles, it is understood that such analysis should be made after a time period of retention to insure a condition of equilibrium, as for example after the container in which the powder is sealed has been permitted for a period of at least 48 hours. The oxygen content of the inert gas discharged from the treating space whether it be carbon dioxide, nitrogen or other gas, may, however, be employed as an index of the amount of oxygen removed from the food product by the treatment and, in general, it is sufficient to carry on the treatment with inert gas until the inert gas displaced from between the particles of the food and discharged from the treating space has an oxygen content between 1 and 3%.

[At the end of the above treatment period, the treated charge of powder is removed from the bulk container for packaging in sealed containers. This packaging operation requires complicated equipment for automatic operation and is a time consuming one. In order to avoid complicating the packaging operation more than it is, packaging is not presently attempted using airtight equipment. This handling in air puts a premium on the preconditioning of the powder because, for example, when a 10,000 pound bulk charge of powder is to be weighed into ten thousand containers each holding 1 pound of powder the operation at best is completed in 2 to 3 hours and when operations are interrupted for any reason the period of standing in air may be 4 to 6 hours or more. While long term vacuum treatment as a preconditioner minimizes the effect of handling in air for very short periods, the rapid diffusion of atmospheric air back into the cores of milk particles left at reduced pressures at the end of the vacuum treatment precludes its use when handling large bulk quantities. By the use of the gas method of preconditioning the core space within milk particles is always at approximately atmospheric pressure and at the end of the treatment is substantially filled with inert gas with only an amount of oxygen reduced below deleterious concentration. This makes the problem of oxygen return to the core particles one of slow diffusion which allows hours of handling in air before the internal oxygen concentration reaches the 1.5% to 2% range.]

[At the time of packaging and before sealing it is desirable to vacuumize the contents of the container and after a short period of retention while being evacuated the containers can be sealed under vacuum.]

[If a vacuum pack is not desired, the vacuum can be broken with an inert gas after which the containers are sealed. As a matter of fact, this improved combination of gas pretreatment and packaging permits the use of relatively inexpensive gas mixtures containing a major percentage of carbon dioxide or straight carbon dioxide gas in the final container without danger of standard containers collapsing during storage, something that has never been commercially feasible heretofore.]

By way of illustration, the following is a complete procedure for the treatment of whole milk to produce a canned whole milk powder having associated therewith insufficient oxygen to deleteriously affect the keeping quality of the powder. Thus whole milk is subjected to evaporation by use of suitable equipment, such as vacuum evaporators, to produce a suitable concentrate for subsequent spray drying. The powdered material from the spray drying operation is then introduced directly into barrels or drums with solid carbon dioxide, substantially as previously described. At the time the powder is introduced into the barrels it has a moisture content of the order of 2.0%.

As previously stated by way of example the barrels or drums may be of a size sufficient to take 200 pounds or more of powder, leaving a space at the top of the barrel of say 5 to 6 inches. Assuming that the retention time is to vary from say 18 to 24 hours, 5 pounds of solid carbon dioxide is sufficient, and if it is found necessary to hold the drums for a greater period of time, as for example up to 48 hours, then the amount of solid carbon dioxide can be increased to from 7 to 10 pounds. A 5 pound block can measure 10 by 5 by 2 inches. In the treatment of whole milk, and assuming that 5 pounds of solid carbon dioxide is employed for the treatment of 200 pounds of whole milk powder, optimum results have been secured with a retention time of about 21 hours.

*The determination of the rate of flow of the carbon dioxide gas as such through the powdered milk is a simple chemical-mathematical calculation. Reference may be made to the Handbook of Chemistry and Physics, 30th edition, page 1683, showing a table of density and specific gravity of gases and vapors. By reference to this table it can be shown that 1 cu. ft. of carbon dioxide gas at 32° F. and 1 atmosphere (760 mm.) weighs*

*.12341 pound. Therefore, 5 pounds of Dry Ice will yield 40.5 cu. ft. of gas at 32° F. At ordinary temperatures, as for example, 77° F., the volume will be*

$$40.5 \times \frac{298}{273} = 44.2 \text{ cu. ft.}$$

*We have found that a block of 5 pounds of Dry Ice will last somewhere between 35 and 45 hours, this time being somewhat dependent upon temperature and how closely the powder is packed in the barrel. When a block of 5 pounds of Dry Ice is placed in a 200 pound barrel of powdered whole milk, this means that a total of 44.2 cu. ft. of gas will be discharged over a period of between 35 and 45 hours. If the period of time is 35 hours, the average rate of flow would be*

$$\frac{44.2}{53 \times 2} = .63 \text{ cu. ft. per hour per 100 lbs. of powder}$$

*If the time is 45 hours, the average rate of flow would be*

$$\frac{44.2}{45 \times 2} = .49 \text{ cu ft. per hour per 100 lbs. of powder}$$

*This figure of 44.2 cubic feet may be related to the various specific times of retention stated above. It has been stated that the time should be extended to a period of 15 hours or more to secure the best results. It has been stated that the period may vary between the range of 18 to 24 hours or even longer. It has further been stated with the treatment of whole milk powder by carbon dioxide optimum results have been obtained with a retention time of about 21 hours.*

*If the period of time is 15 hours the rate of flow per 100 pounds of powder would be*

$$\frac{44.2}{15 \times 2} = 1.47 \text{ cubic feet}$$

*Similarly computed the rates of flow for 18 hours would be 1.23 cubic feet, for 21 hours it would be 1.05 cubic feet and for 24 hours it would be .92 cubic foot.*

*It has also been stated that it is desirable to have a retention period such that some carbon dioxide remains in solid condition at the end of the period. This is for the purpose of preventing the atmosphere and hence oxygen from permeating back into the mass of material if flow of carbon dioxide gas had ceased. Consequently to allow for some unsublimed carbon dioxide the specific figures given above should all be reduced at least slightly.*

*While the above figure give an optimum range of from the order of .4 cubic foot to .7 cubic foot per hour per 100 pounds of powdered milk, it will be understood that the rate of sublimation of the solid carbon dioxide will vary dependent upon various factors such as temperatures, density of the powdered product placed on the solid carbon dioxide and the shape of the block. Therefore the rate of gas flow may vary through somewhat wider limits with a range of from .1 to 1.5 cubic feet per 100 pounds of powdered milk per hour.*

After the holding or retention period the contents of the bulk containers are discharged into suitable filling equipment where in the interim between discharging and canning the powder is associated with an atmosphere of air. This equipment delivers the powder in weighed and measured amounts to can or other containers in which the powder is to be marketed. It is desirable at this time to subject the powder to a short vacuum treatment to remove the air externally associated with the powder.

One type of this filling equipment which has been used employs cans of the type having lids provided with small vent holes for vacuumizing after filling. After such cans are filled with the powder, the lids are applied and then the cans are subjected to vacuumizing treatment whereby the contents of the cans are evacuated to an atmospheric pressure of from 0.25 to 0.5 of an inch mercury, for a short period of time such as from 1 to 5 minutes. If a vacuum pack is desired the cans can then be sealed under vacuum. In most instances, however, it is more desirable to break the vacuum by application of an inert gas. It is preferable that this inert gas be introduced to produce a pressure within the container somewhat greater than atmospheric, as for example from 1 to 4 pounds per square inch. As the cans proceed to the solder sealing equipment for soldering the vent hole, some of the inert gas escapes so that after soldering pressure within the can is atmospheric or only slightly greater than atmospheric.

Assuming that in the pretreatment the free oxygen content has been reduced to the desired level, the residual oxygen, after vacuumizing and breaking the vacuum with an inert gas as described above, in the atmosphere within the sealed cans is of the order of 1.0 to 1.5% or less after a retention period of at least 48 hours. Without the pretreatment the process as described above would leave a free oxygen content of 2.5% to 4% in the canned spray dried whole milk powder. The above figures assume a short period of exposure to air. If the above treated powder stands surrounded by an atmosphere of air for 2 to 6 hours and is then packaged, vacuum treated and gassed, the residual oxygen in cans, stored seven days before testing, generally remains in the 1.0 to 1.4% range despite 2 hour exposure and is still in the 1.4 to 1.6% safe range after 6 hours' exposure to air. While long term vacuum treatment as a preconditioner minimizes the effect of handling in air for short periods, the rapid diffusion of atmospheric air back into the cores of milk particles left at reduced pressures at the end of the vacuum treatment during the first two hours reduces the overall efficiency of oxygen removal and markedly lessens the desirability of handling large bulk quantities in this manner.

As previously stated the moisture content of the whole milk powder leaving the spray drier can be of the order of 2.0%. There is no appreciable variation in this moisture content throughout treatment, which is attributed to the fact that the carbon dioxide gas is devoid of moisture and because the outflow of carbon dioxide gas from the barrels or drums tends to counteract any tendency for inflow of moisture from the surrounding air. This likewise applies to the nitrogen or other inert gas used in the vacuumizing operation. The various constituents of the whole milk powder, including the fat content, are not affected to any virtual degree by the process. In this connection both the titratable acidity and the hydrogen ion concentration of the material have been proven by analysis to remain relatively constant.

We claim:

[1. The method of packaging spray dried powdered milk having air associated therewith both between the particles of said powdered milk and in the interior of said particles so as to reduce the oxygen content of said powdered milk, which method comprises the steps of, introducing the powdered milk into a confined space to form a bulk mass therein, displacing the air between said particles in said space with inert gas, whereby the inert gas diffuses into the interior of the particles to replace oxygen therein and the replaced oxygen diffuses into the inert gas between the particles to increase the oxygen content of the inert gas between said particles, further displacing the gas between said particles with fresh inert gas to cause further diffusion and replacement of oxygen with inert gas in the interior of said particles while discharging the displaced gas from said space, continuing the further displacement of the gas between the particles with fresh inert gas and the discharge of displaced gas from said space at least until the oxygen content of the discharged gas is reduced to between approximately 1 and 3% when calculated relative to a discharge flow of .01 to .15 cubic feet per hour per 100 pounds of powdered milk, and thereafter removing the resulting powdered milk from said space and packaging the same in sealed packages under non-oxidizing conditions.]

[2. The method of packaging as defined in claim 1, in which the resulting powdered milk is removed from said space into contact with the atmosphere and thereafter introduced into final containers, and in which the containers are subjected to vacuum conditions to remove air from between said particles and said containers are sealed under non-oxidizing conditions.]

[3. The method of packaging as defined in claim 1, in which the powdered milk is removed from said space into contact with the atmosphere and thereafter introduced into final containers, and in which the containers are subjected to vacuum conditions to remove air from between said particles within six hours after said powdered milk is removed from said space into contact with the atmosphere, and an inert gas is thereafter introduced into said containers and said containers are sealed.]

[4. The process as defined in claim 1, in which the gas between the particles is further displaced at a rate between .01 and .15 cubic feet per hour per 100 pounds of powdered milk.]

5. The method of packaging spray dried powdered milk composed of particles having a gas containing free oxygen associated therewith, both between the particles and in the interior of the particles so as to reduce the oxygen content of the powder, which method comprises the steps of, introducing the powder into a confined space to form a bulk mass therein, displacing the oxygen-containing gas between said particles in said space with inert gas, whereby inert gas diffuses into the interior of the particles to replace the oxygen therein and the replaced oxygen diffuses into the inert gas between the particles, further displacing the gas between said particles with fresh inert gas to cause further diffusion and replacement of oxygen with inert gas in the interior of said particles while discharging the displaced gas from said space, continuing the further displacement of the gas between the particles with fresh inert gas and discharge of displaced gas from said space for a period of at least about 15 hours, thereafter introducing the powder into final containers and subjecting said containers to vacuum conditions within about 6 hours after said food product is removed from said space into contact with the atmosphere and sealing said containers under non-oxidizing conditions.

6. The method of packaging as defined in claim 5, in which a body of solid carbon dioxide is placed in said space to supply said inert gas.

*7. The method of packaging spray dried powdered milk having air associated therewith both between the particles of said powdered milk and in the interior of said particles so as to reduce the oxygen content of said powdered milk, which method comprises the steps of, introducing the powdered milk into a confined space to form a bulk mass therein, displacing the air between said particles in said space with inert gas, whereby the inert gas diffuses into the interior of the particles to replace oxygen therein and the replaced oxygen diffuses into the inert gas between the particles to increase the oxygen content of the inert gas between said particles, further displacing the gas between said particles with fresh inert gas to cause further diffusion and replacement of oxygen with inert gas in the interior of said particles while discharging the displaced gas from said space, continuing the further displacement of the gas between the particles with fresh inert gas and the discharge of displaced gas from said space at least until the oxygen content of the discharged gas is reduced to between approximately 1 and 3% when measured in gas having a discharge flow rate of the order of from .4 to .7 cubic feet per hour per 100 pounds of powdered milk, and thereafter removing the resulting powdered milk from said space and packaging the same in sealed packages under non-oxidizing conditions.*

*8. The method of packaging as defined in claim 7, in which the resulting powdered milk is removed from said space into contact with the atmosphere and thereafter introduced into final containers, and in which the containers are subjected to vacuum conditions to remove air from between said particles and said containers are sealed under non-oxidizing conditions.*

*9. The method of packaging as defined in claim 7, in which the powdered milk is removed from said space into contact with the atmosphere and thereafter introduced into final containers, and in which the containers are subjected to vacuum conditions to remove air from between said particles within six hours after said powdered milk is removed from said space into contact with the atmosphere and an inert gas is thereafter introduced into said containers and said containers are sealed.*

*10. The process as defined in claim 7, in which the gas between the particles is further displaced at a rate of the order of from .4 to .7 cubic feet per hour per 100 pounds of powdered milk.*

*11. The method of packaging spray dried powdered milk having air associated therewith both between the particles of said powdered milk and in the interior of said particles so as to reduce the oxygen content of said powdered milk, which method comprises the steps of, introducing the powdered milk into a confined space to form a bulk mass therein, displacing the air between said particles in said space with inert gas, whereby the inert gas diffuses into the interior of the particles to replace oxygen therein and the replaced oxygen diffuses into the inert gas between the particles to increase the oxygen content of the inert gas between said particles, further displacing the gas between said particles with fresh inert gas to cause further diffusion and replacement of oxygen with inert gas in the interior of said particles while discharging the displaced gas from said space, continuing the further displace-*

*ment of the gas between the particles with fresh inert gas and the discharge of displaced gas from said space at least until the oxygen content of the discharged gas is reduced to between approximately 1 and 3% when measured in gas having a discharge flow rate within the range of from .1 to 1.5 cubic feet per hour per 100 pounds of powdered milk, and thereafter removing the resulting powdered milk from said space and packaging the same in sealed packages under non-oxidizing conditions.*

*12. The method of packaging as defined in claim 11, in which the resulting powdered milk is removed from said space into contact with the atmosphere and thereafter introduced into final containers, and in which the containers are subjected to vacuum conditions to remove air from between said particles and said containers are sealed under non-oxidizing conditions.*

*13. The method of packaging as defined in claim 11, in which the powdered milk is removed from said space into contact with the atmosphere and thereafter introduced into final containers, and in which the containers are subjected to vacuum conditions to remove air from between said*

*particles within six hours after said powdered milk is removed from said space into contact with the atmosphere and an inert gas is thereafter introduced into said containers and said containers are sealed.*

*14. The process as described in claim 11, in which the gas between the particles is further displaced at a rate within the range of from .1 to 1.5 cubic feet per hour per 100 pounds of powdered milk.*

PAUL F. SHARP.
ARELL J. WASSON.

REFERENCES CITED

The following references are of record in the file of this patent or the original patent:

UNITED STATES PATENTS

| Number | Name | Date |
|---|---|---|
| 2,027,429 | Hansen | Jan. 14, 1936 |
| 2,149,790 | Roesch | Mar 7, 1939 |
| 2,335,192 | Moore | Nov. 23, 1943 |
| 2,353,029 | Graham, Jr. | July 4, 1944 |
| 2,363,445 | Shipstead et al. | Nov. 21, 1944 |
| 2,412,635 | Sharp | Dec. 17, 1946 |

Certificate of Correction

Reissue No. 23,548 September 9, 1952

PAUL F. SHARP ET AL.

It is hereby certified that error appears in the printed specification of the above numbered patent requiring correction as follows:

Column 7, lines 18 and 19 for $$\frac{44.2}{53\times 2} \quad \text{read} \quad \frac{44.2}{35\times 2}$$

line 54, for "*figure*" read *figures*;

and that the said Letters Patent should be read as corrected above, so that the same may conform to the record of the case in the Patent Office.

Signed and sealed this 24th day of February, A. D. 1953.

[SEAL]

THOMAS F. MURPHY,
*Assistant Commissioner of Patents.*